July 2, 1968 R. BABIGAN 3,391,005
METHOD FOR PREPARATION OF A FRIED POTATO PRODUCT WHICH HAS
AN EXTERIOR OF CRISP RIBS AND A SOFT MEALY INTERIOR
Filed May 25, 1964
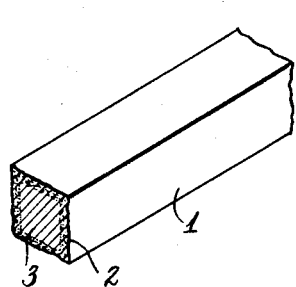
Fig. 1.
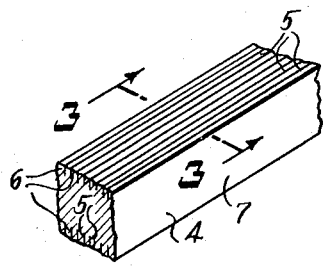
Fig. 2.
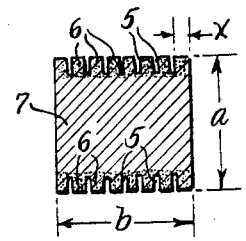
Fig. 3.
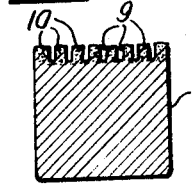
Fig. 4.
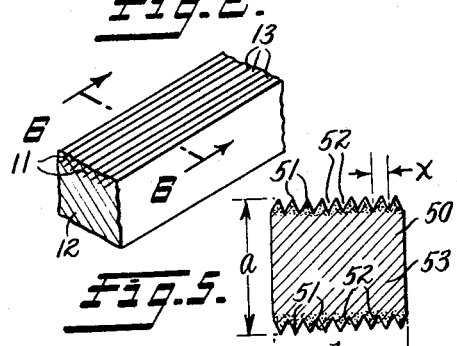
Fig. 5.  Fig. 5A.
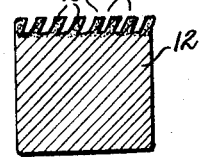
Fig. 6.
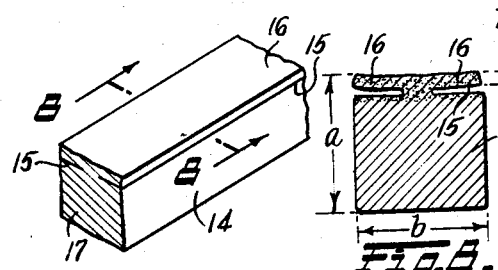
Fig. 7.  Fig. 8.
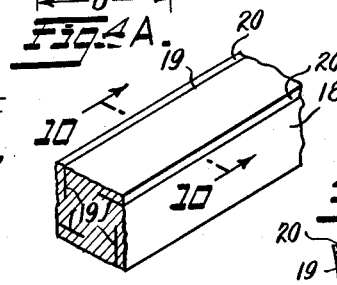
Fig. 9.
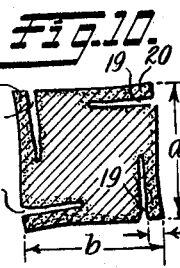
Fig. 10.
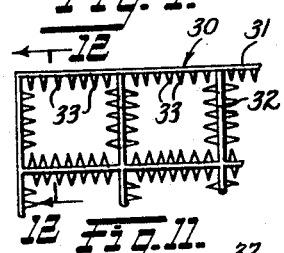
Fig. 11.
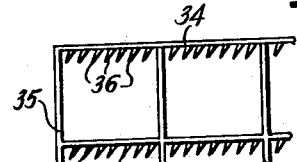
Fig. 13.
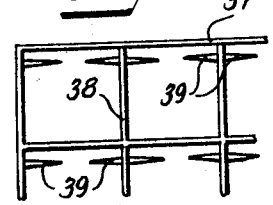
Fig. 14.
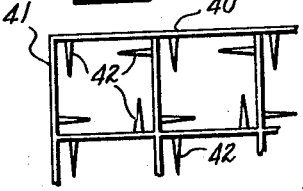
Fig. 15.
Fig. 12.
INVENTOR
Raymond Babigan

United States Patent Office 3,391,005
Patented July 2, 1968

3,391,005
METHOD FOR PREPARATION OF A FRIED POTATO PRODUCT WHICH HAS AN EXTERIOR OF CRISP RIBS AND A SOFT MEALY INTERIOR
Raymond Babigan, Washington, D.C., assignor of forty percent to Harold L. Halpert, Silver Spring, Md.
Filed May 25, 1964, Ser. No. 369,782
1 Claim. (Cl. 99—100)

ABSTRACT OF THE DISCLOSURE

A fried potato product comprising a polygonal segment of potato having formed thereon a plurality of fried projections. The projections are sufficiently thin to be fried throughout the thickness during the frying step.

---

This invention relates to a new and useful food product and especially to a fried potato product.

Fried potatoes as made conventionally are sliced so as to have a rectangular or triangular cross section with surfaces which are planar. A typical potato, for example, will have a square cross section and four lengthwise extending plane surfaces. Such a potato, when fried by the usual methods, will have a browned surface area which may be crisp, and a soft mealy interior. However, soon after cooking, the surface area loses its crispness so that the potato then becomes soft throughout.

It is possible to fry potatoes so that they will retain their crispness by frying for a considerable length of time. However, this causes shrinkage and is wasteful and also introduces the danger of overcooking.

An important object of my invention is to produce a fried potato which has greater and more lasting crispness than the conventional fried potato.

It is a further important object of my invention to produce such a fried potato without any increase in cost over present conventional methods.

A further object is to produce a fried potato which has particular usefulness as a frozen food product.

A further and important object of my invention is in a new and improved cutter device for cutting a potato into the particular shapes whereby increased and lasting crisp external areas are produced.

Other and important objects of this invention will become apparent from the following description and appended claim.

In the drawings;

FIG. 1 is a perspective view of a fried potato produced by conventional methods.

FIG. 2 is a perspective view of one embodiment of my invention.

FIG. 3 is a cross section along the line 3—3 of FIG. 2.

FIG. 4 is a cross section of a further embodiment.

FIG. 4A is a cross section of a further embodiment.

FIGS. 5 to 10 are views of additional embodiments, with FIGS. 6, 8 and 10 being cross sections along the lines 6—6 of FIG. 5, 8—8 of FIG. 7 and 10—10 of FIG. 9, respectively.

FIG. 11 is a top plan view of a cutter for cutting a potato of the type shown in FIG. 2.

FIG. 12 is a cross sectional view along the line 12—12 of FIG. 11.

FIGS. 13 to 15 are plan views of the cutter for cutting a potato of the type shown in FIGS. 5, 6, FIGS. 7, 8 and FIGS. 9, 10, respectively.

Referring first to FIG. 1 there is shown in this figure a conventional fried potato 1 having a rectangular cross section with four lengthwise extending planar surfaces. A potato cut in this manner and then fried will have immediately after frying a very thin layer 2 which may or may not be crisp, and a soft, cooked interior portion 3. It is typical of such a potato that the layer 2, if crisp immediately after frying, will not retain its crispness soon after removal from the frying fat. I am not sure why this is so, but it probably is due to the extreme thinness of the layer 2 and also to possibility of absorption of moisture from the soft portion 3.

Referring to FIG. 2 there is shown one embodiment of my invention for obtaining a greater proportion of crisp area. As shown in this figure the potato is provided with a plurality of slits 5 extending along the exterior surface of the potato. The slits 5 delineate longitudinally extending portions 6, which may be considered to be longitudinally extending projections. The slits 5 are shown in this figure as being in two opposed planar surfaces of the potato. However, it is obvious that the slits may be provided in one surface only (e.g. FIG. 5), in all surfaces (e.g. FIG. 9) or in any number of available surfaces.

After a potato has been cut or sliced as in FIG. 2, and then slitted as shown in that figure it is fried according to any well known conventional method. These frying techniques are so well known that detailed description is not necessary.

After cutting or slicing and then slitting along lines 5, the potato is fried. The resulting potato is shown in FIG. 3. As shown in this figure the longitudinally extending portions 6, shown heavily shaded, have been fried crisp and the interior portion 7 is cooked but is soft and mealy.

An important aspect of the invention is the relationship of the various dimensions of the cut potato and the width of the projections 6. The maximum width of the projections 6, represented by X, is substantially less than the width and thickness, $a$, $b$ of the cut potato. Because of this relationship the interior of the potato will be soft and mealy while the projecting portions will be crisp.

It has been found that a potato which has been cut and slit in the manner shown in FIG. 2 will not always result in the fried product shown in FIG. 3, that is, a product in which projections 6 are separated by slits 5. This is due to the fact that projections 6 may stick together so that the frying fat will not enter the slits 5. As a consequence, when this happens, the potato will be fried crisp only at the exterior surface.

One method of overcoming this difficulty is illustrated in FIG. 4 in which very narrow grooves 9 (as distinguished from slits) are cut into the potato 8. Where narrow grooves are provided rather than slits, the frying fat may enter the grooves and the hot fat will thus contact three sides of the projection 10. As shown in this figure the heavily shaded portions 10 are crisp whereas the interior of the potato is soft. In this embodiment, as in FIG. 3 the maximum width of projection 10 is substantially less than the width and thickness of the cut potato.

A further embodiment is shown in FIG. 4A wherein a cut potato 50 is longitudinally grooved in saw tooth outline as at 52 to provide longitudinally extending projections 51. After frying the heavily shaded portions 51 will be crisp whereas the interior 53 will be soft. As shown in this figure the maximum width X of the projection is substantially less than the dimensions $a$ and $b$ representing the width and thickness of the cut potato.

A further embodiment is shown in FIG. 5 in which the slits 11 are disposed at a non-perpendicular angle with respect to the planar surface of the potato. When slit in this manner, there is less likelihood of the projections sticking together for the reason that during the frying process the projections tend to curl into the position shown in FIG. 6 and thereby to become spaced from one another. Consequently the frying fat is able to enter the spaces 11 between the projections 13 which will then be crisp fried while the interior 12 is cooked to a soft texture.

In the embodiment shown in FIGS. 7 and 8 a cut potato 14 is slit along the lines 15 to form longitudinally extending portions 16. After frying the portions 16 will be crisp and slightly spaced from the soft interior portion as shown in FIG. 8. Also, as shown in FIG. 8, the maximum width of portion or projection 16 is substantially less than width and thickness dimensions *a* and *b*.

In the embodiment shown in FIGS. 9 and 10, the cut potato 18 is slit at 19 to form projecting portions 20, there being a single inwardly extending slit 19 at each planar face of the potato. After frying, the portions 20 will be crisp. It is to be noted that the portion 20 (and the corresponding portions in the other figures) provides a crisp portion which is considerably thicker than the crisp layer 2 of the conventionally cut and fried potato of FIG. 1.

It is obvious that the potato may be cut in any desired manner and at any particular point prior to frying. For example, the slits and projections may be made with a hand knife or automatically, and they may be made at the same time as the potato is being cut into its rectangular cross section, or afterward. The important thing is that the ultimate sliced potato shall have projections thereon, of particular dimensions, regardless of how produced.

Potatoes produced in accordance with this invention may be consumed relatively immediately after being cooked, or importantly, they may be frozen and packaged. When the frozen product is reheated preparatory to consumption, the projecting areas will become crisp and will retain their crispness for a longer time than the conventional fried potato.

FIGS. 11 to 15 illustrate cutters which may be utilized to cut the raw potato prior to frying. In each of these figures the cutter is shown as being formed of knife members arranged in crossed relationship in the form of a grid.

In FIG. 7 the cutter 30 is comprised of knife members 31, 32 arranged in the form of a grid having upper cutting edges and provided on their inner faces with a plurality of inwardly extending cutting blades 33. As shown in FIG. 12 these blades are tapered from top to bottom and are provided with a cutting edge along the tapered portion. The cutter of FIG. 11 is used to produce the potato shown in FIG. 2. A raw peeled potato may be pushed through the cutter or if desired the cutter may be pushed through the potato to form a plurality of sections of the type shown in FIG. 2.

The cutter member shown in FIG. 13 is comprised of knife members 34, 35 provided with inwardly extending cutting blades 36. This cutter will produce the potato section illustrated in FIG. 5 for the reason that the cutter blades 36 are not perpendicular to the knife members.

The cutter member shown in FIG. 14 is comprised of knife members 37, 38 provided with inwardly extending blade members 39. As shown in this figure there are two blade members in each rectangle of the cutter assembly. This cutter will produce the potato section illustrated in FIG. 7.

In FIG. 15 the cutter is comprised of knives 40, 41 having a cutter blade 42 on each inner face of the knife. A potato cut by this cutter will result in potato sections having the configuration shown in FIG. 9.

To produce the potato sections illustrated in FIGS. 4 and 4A it is necessary only to shape the knife members, which form the grid, to have the same configuration as the projecting portions of the potato. For example the knife member 31 of FIG. 11 would have either the configuration of the members 10 of FIG. 4, or else have a saw tooth configuration, similar to the projections 51 shown in FIG. 4A. Additional blades such as 33 are not necessary.

In the practice of my invention a raw potato is peeled and then cut by one of the cutters illustrated in FIGS. 11 to 15. The cut, raw potato sections are then fried by conventional methods until the projecting portions are crisp and the inner body of the potato is soft. The potato may then be consumed or frozen and packaged for sale in frozen food counters.

While in the foregoing specification, I have set forth various embodiments for the purpose of illustrating the invention, it will be understood that details within the scope of the appended claim are possible and are contemplated.

I claim:
1. A method for making a fried potato product comprising the steps of cutting a raw potato into elongated strips of rectangular cross section and forming on at least two surfaces thereof a plurality of thin parallel ribs, said ribs being formed to have a maximum width which is substantially less than the width and the thickness of the strip of potato, the dimensions of the ribs with respect to the remainder of the potato being such that when the potato is fried the ribs are crisp throughout and the interior of the potato is soft and mealy, then frying the strips until the ribs are crisp throughout and the interior of the potato between said surfaces is soft and mealy.

References Cited

UNITED STATES PATENTS 2,769,715   11/1956   Stahmer _____ 99—100
3,217,768   11/1965   Lamb _____ 146—78 X
3,273,617    9/1966   Lamb _____ 146—78

HYMAN LORD, *Primary Examiner.*

A. LOUIS MONACELL, *Examiner.*

D. M. NAFF, *Assistant Examiner.*